March 20, 1945.  M. M. CUNNINGHAM  2,371,954
SEAT BASE OR THE LIKE AND METHOD OF MAKING SAME
Filed July 26, 1940  3 Sheets-Sheet 1
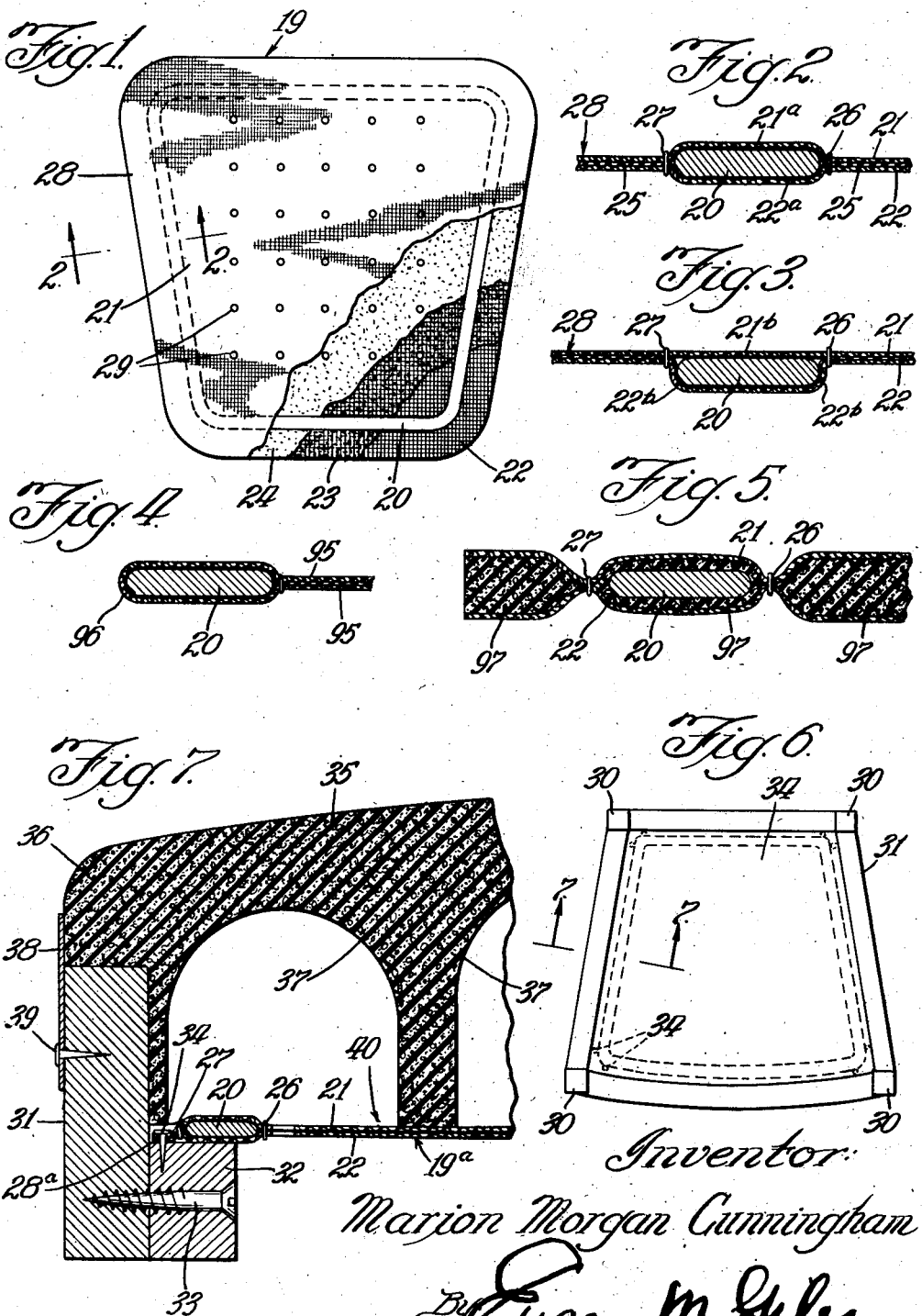
Inventor:
Marion Morgan Cunningham
By Eugene M. Giles
Atty.

March 20, 1945. M. M. CUNNINGHAM 2,371,954
SEAT BASE OR THE LIKE AND METHOD OF MAKING SAME
Filed July 26, 1940 3 Sheets-Sheet 2
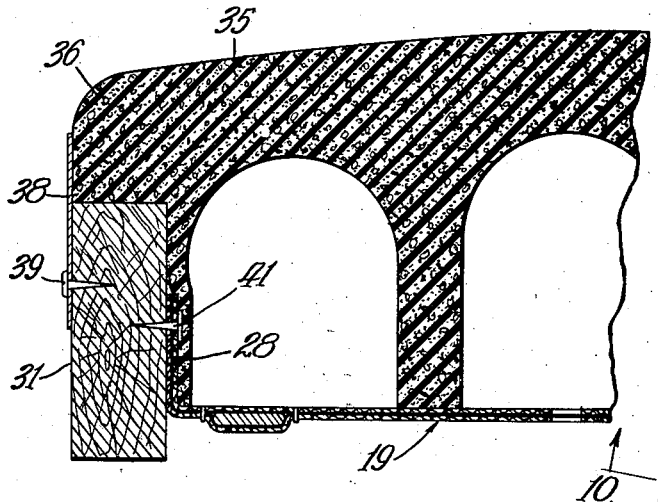
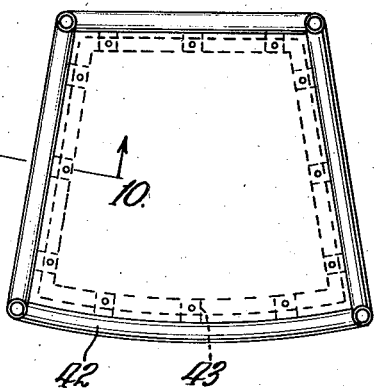
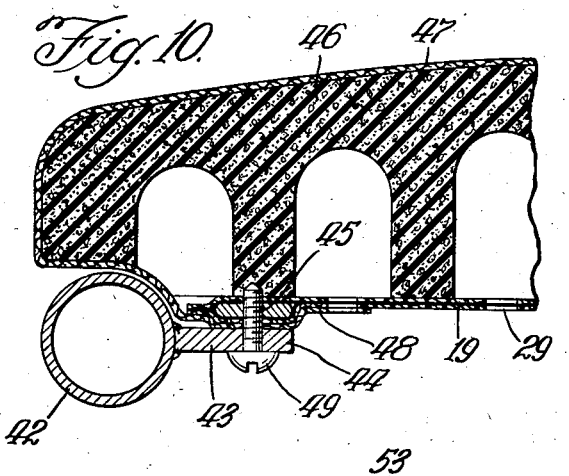
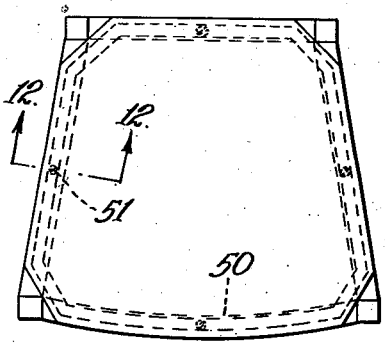
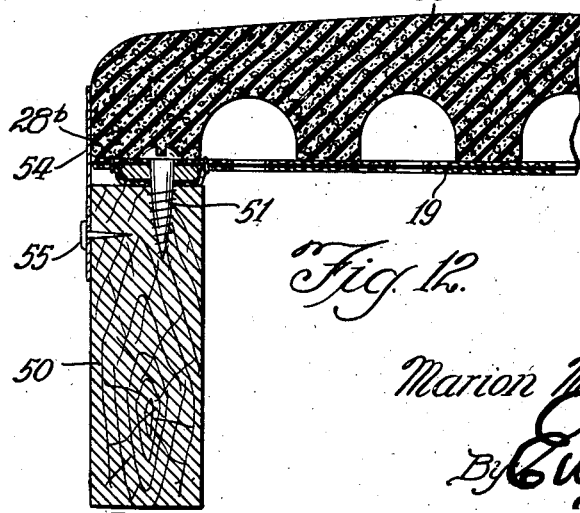
Inventor:
Marion Morgan Cunningham
By Eugene M. Giles Atty March 20, 1945. M. M. CUNNINGHAM 2,371,954
SEAT BASE OR THE LIKE AND METHOD OF MAKING SAME
Filed July 26, 1940 3 Sheets-Sheet 3
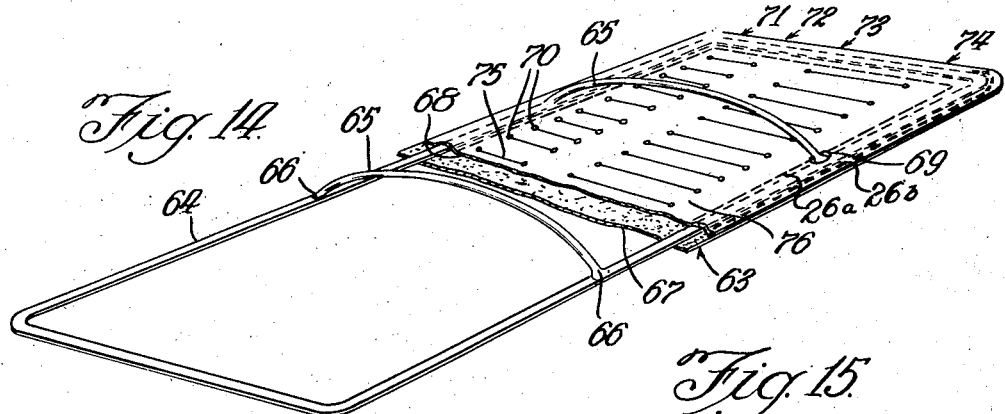
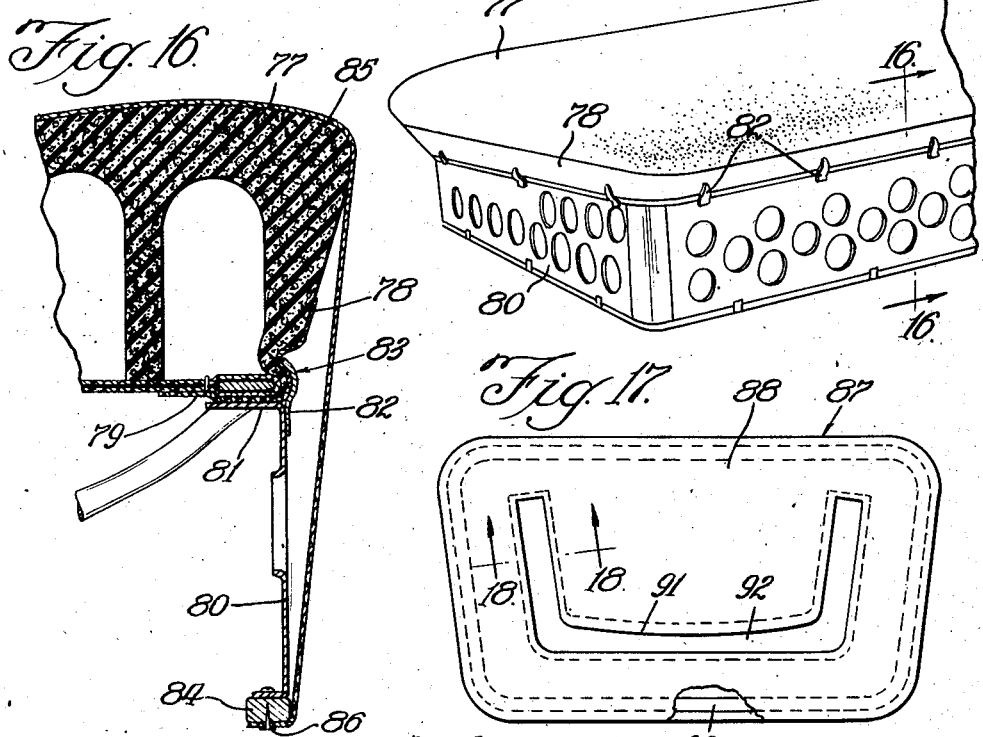
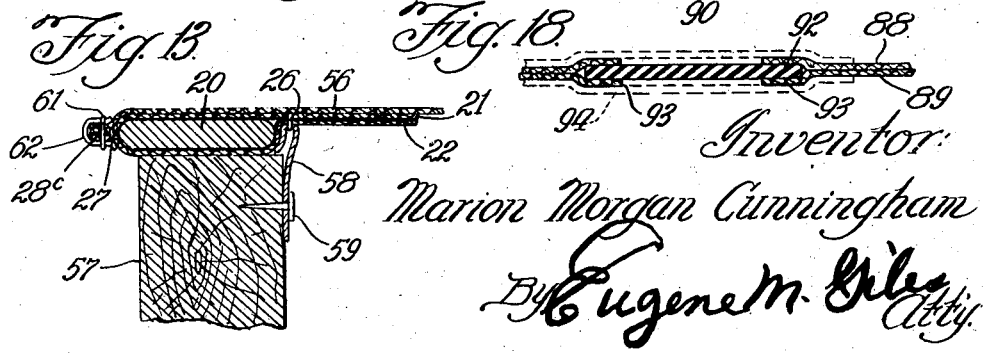
Inventor:
Marion Morgan Cunningham
By Eugene M. Giles
Atty.

Patented Mar. 20, 1945

2,371,954

UNITED STATES PATENT OFFICE 2,371,954

SEAT BASE OR THE LIKE AND METHOD OF MAKING SAME

Marion Morgan Cunningham, South Bend, Ind., assignor to Mishawaka Rubber and Woolen Manufacturing Company, Mishawaka, Ind., a corporation of Indiana Application July 26, 1940, Serial No. 347,627

7 Claims. (Cl. 45—138)

This invention relates to improvements in bases for seat bottoms, seat backs, or other similar purposes, and has reference more particularly to a flat pre-stretched unit of fabric or similar material which may be prepared separately in a tensioned condition ready for installation on the frame of a chair, seat, or the like. The term seat base as used in the present specification and appended claims is intended to include a base for seat backs as well as seat bottoms, and also a base for any other similar purpose.

In the manufacture of chairs, davenports, automobile seats, and other similar articles, it is desirable to provide a base which is light, strong, easily applied and which will resist repeated flexure without appreciable sagging. In many cases, for example, in automobile seats, a base of minimum depth is desired. Also it is desirable and even essential in many cases to prepare the base separately as a complete, prestretched unit ready for installation and it is of course important that such unit be readily adaptable to and conveniently installed on any form of chair, seat, or similar structure.

The principal objects of my invention are to provide a simple and substantial pre-stretched base of the above indicated character; to insure easy and rapid production thereof; to afford adequate yieldability for ease and comfort; to avoid any appreciable sagging, to economize space; to provide a seat base construction which is readily adaptable to a variety of seat structures and different types of mounting; to permit advantageous combining of cushions of rubber or the like therewith; and, in general, to improve seating structures and the like and the manufacture thereof, these and other objects being accomplished as pointed out hereinafter and as shown in the accompanying drawings, in which:

Fig. 1 is a plan view of a seat base of chair bottom type embodying one form of the present invention, portions of successive layers being broken away to disclose details of the construction;

Fig. 2 is a fragmentary enlarged sectional view on the line 2—2 of Fig. 1;

Figs. 3, 4 and 5 are sectional views similar to Fig. 2 showing modifications of the invention;

Fig. 6 is a plan view of a chair frame with a seat base embodying the present invention mounted therein;

Fig. 7 is an enlarged fragmentary sectional view on the line 7—7 of Fig. 6 with a portion of a rubber cushion shown in position therein;

Fig. 8 is a sectional view similar to Fig. 7 showing a modified form of seat base mounting;

Fig. 9 is a plan view of a chair of tubular steel construction showing a modified seat base mounting;

Fig. 10 is an enlarged fragmentary sectional view on the line 10—10 of Fig. 9 but with an upholstered rubber cushion mounted on the seat base;

Fig. 11 is a plan view of a chair with a further modified form of seat base mounting;

Fig. 12 is an enlarged fragmentary sectional view on the line 12—12 of Fig. 11 but with a portion of a rubber cushion mounted thereon;

Fig. 13 is a fragmentary sectional view through a chair frame with a modified form of seat base mounted thereon;

Fig. 14 is a perspective view looking at the bottom of an automobile type seat base or deck with parts of the fabric broken away;

Fig. 15 is a view also in perspective showing an end portion of an automobile type seat structure embodying the seat base or deck of Fig. 14;

Fig. 16 is an enlarged fragmentary sectional view on the line 16—16 of Fig. 15 but with upholstery in position thereon;

Fig. 17 is a plan view of a modified type of seat base with elastic insert;

Fig. 18 is an enlarged fragmentary sectional view on the line 18—18 of Fig. 17.

Referring to the drawings, and especially to Fig. 1 thereof, which shows a type of seat base embodying the invention and suitable for use as a seat bottom or deck for dining room chairs, theater seats or the like, the reference numeral 19 indicates the seat base as a whole which comprises a flat continuous marginal frame 20 secured between two layers 21 and 22 of strong relatively non-stretchy fabric, such as duck or canvas, which are adhesively joined to one another and secured in a tightly stretched condition to the frame 20.

The frame 20 is preferably of flat steel and of suitable width to rigidly withstand the strain of the stretched fabrics and to hold these fabrics in a tightly stretched condition in use, and this frame is merely of sufficient thickness to insure requisite rigidity, a width of five-eighths of an inch and thickness of one-eighth of an inch having been found quite satisfactory. It is shaped edgewise according to the shape required for the particular chair seat or chair back for which it is to be used and is prepared in an endless or continuous form and of uniform width and thickness throughout. Obviously, this seat-shaped ring may be cut from flat stock or in some cases may even be of material which may be molded in the desired shape but is preferably made of a flat steel strip shaped to the required form and having the ends welded together to form an endless flat frame.

The two sheets or layers 21 and 22 of fabric are coated on their inner faces with a suitable material to insure bonding thereof securely and permanently together, rubber compounds or compositions being preferably used for the purpose and subsequently vulcanized as this not only insures inseparability of and added strength to the fabric layers but the rubber affords elasticity and the vulcanization contributes an increased tensioning of the fabric.

In practice, the fabrics, before assembling are frictioned on their inner faces with rubber compound applied by calendering and this compound is thus pressed into the fabric interstices and becomes securely bonded to the fabric threads, this friction coating being indicated at 23. Then a gum coating 24 is applied to the inner frictioned face of each fabric 21 and 22, this coating being preferably of a sufficiently tacky character so that the two gum coatings will readily adhere to one another upon pressing the two fabrics together, and upon vulcanization the friction surfacings and gum coatings become consolidated into a unitary mass 25 with the fabric layers 21 and 22 intimately combined therewith, thus producing an inseparable structure of great strength and with the marginal frame 20 permanently secured between the fabric layers.

The frictioning also has the advantage that the rubber compound is applied while the fabric is stretched in the direction of its length and the pressing of the compound into the interstices stretches the fabric in a direction at right angles to its length so that the fabric as prepared for assembly is prestretched in two directions. Upon subsequent vulcanization, after assembly on the frame 20, the softening of the rubber relieves the stretch imparted to the fabric in the frictioning and allows the fabric to shrink and thus the range of elasticity in the final seat base is minimized.

The fabrics 21 and 22 and their friction surfacings 23 and gum coatings 24 extend outwardly beyond the marginal frame 20 so that these layers are vulcanized together both inside and outside the frame 20, and in addition these layers are stitched together with strong thread close to the frame 20 both along the inside and outside thereof as indicated at 26 and 27 respectively. Thus a two ply fabric margin 28 with the two fabric portions thereof vulcanized together is provided around the frame which said margin may in some cases be trimmed off close to the outer stitching 27 or be retained for use in mounting the seat base as required.

In making this seat base, the frictioned and gum coated fabric layer 21 (or 22) is laid out flat with the gum face uppermost and the marginal frame 20 laid thereon in the proper position, after which the other gum coated fabric layer is laid thereover with the gum face downward. Then the assembled two fabrics 21 and 22 and frame 20 are passed between pressure rolls, so as to press the two fabrics together in closely adhering relation with the marginal frame enclosed therebetween.

At least one of the above mentioned pressure rolls has a surface sufficiently cushiony to accommodate the extra thickness at the frame 20 while at the same time pressing the two fabrics tightly together elsewhere or both rolls may have a cushiony surface depending upon the desired arrangement of the marginal frame on the fabrics. If both rolls have similarly cushioned surfaces the fabrics 21 and 22 are pressed equally onto the frame 20 or to an equal depth with respect thereto as shown at 21$^a$ and 22$^a$ in Fig. 2, whereas if one roll has a relatively firm surface and the other roll a cushiony surface, the fabric layer 21 engaged by the relatively firm surfaced roll will remain flat as shown at 21$^b$ in Fig. 3 whereas the other fabric layer 22 engaged by the cushion surfaced roll will be shaped about the frame 20 as indicated at 22$^b$ in Fig. 3, thereby providing a flat topped seat base which is desired in some cases.

After the fabrics 21 and 22 and frame 20 have been thus assembled, the fabrics are stretched and stitched in any convenient manner. In practice I employ a machine such as shown in my separate application Serial No. 350,597, filed August 3, 1940, which stretches the fabrics outwardly around the frame 20 and secures the fabrics firmly together immediately outside the frame in the stretched condition. In that machine, stretching members grasp the outer margin 28 of the fabrics and pull same outwardly around the frame 20 so as to stretch the fabrics tightly while at the same time the two fabrics 21 and 22 are rolled tightly together close up against the outer margin of the frame 20 so that they firmly adhere at this place. Thereafter the stitchings 26 and 27 are applied around the inner and outer margins respectively of the frame 20.

After the seat base has been completed as above and the fabrics stretched and stitched along opposite sides of the frame 20, the entire structure is subjected to appropriate curing temperature to vulcanize the frictioning rubber 23 and rubber coatings 24, thereby consolidating the rubber and by means of the vulcanized rubber inseparably bonding the fabric layers 21 and 22 together throughout their area except at the location of the frame 20 which is tightly secured in a fabric and rubber pocket which is in effect molded around and to the frame. After vulcanization the area of the base within the frame 20 is preferably provided with a plurality of small perforations 29 for ventilation.

Moreover, if desired, the assembled seat base may, before vulcanization thereof, be dipped, sprayed or otherwise treated with latex to impregnate the fabric, the latex treatment serving not only to waterproof and give additional strength to the fabric, but it also causes a shrinkage of the fabric upon vulcanization which increases the tension of the completed base.

This seat base 19 may be mounted in various ways depending on one's particular preference or the particular construction of the chair frame upon which it is to be mounted and the type of cushioning that is employed therewith.

For example, in the structures of Figs. 6 and 7 in which a dining room type of chair is shown with conventional legs 30 and seat frame 31, the frame 31 has cleats 32 secured to the inner face thereof near the bottom by screws 33. The seat base 19$^a$ is made of suitable shape and size so as to fit within the seat frame 31 as shown in Fig. 6 with the marginal frame 20 overlying the cleats 32 as shown in Fig. 7 and the margin 28 of the seat base is trimmed off so as to leave only a narrow width thereof indicated at 28$^a$ remaining beyond the frame 20 as shown in Fig. 7. To hold this seat base on the cleats, a few tacks 34 may be driven through this narrow margin 28ª into the cleats 32, preferably two at each corner as indicated in Fig. 6. In this construction a weight on the seat is supported directly by the frame resting on the cleats 32.

Any desired cushion may be applied on this seat base 19ª of Fig. 7, although it is preferred to employ a cushion of latex foam such as indicated at 35 molded to shape to extend down into the chair well and rest on the seat base and with overhanging margins 36 overlying the frame 31, such cushions being customarily formed with a plurality of cavities 37 in the under side. This cushion 35 is preferably cemented to the top face of the seat base 19ª and has a tape 38 extending therearound and cemented to the overhanging portion 36 and this tape extends downwardly around the chair frame 31 and is tacked thereto at intervals as indicated at 39. The cushion is then covered in the usual manner with an upholstery covering (not shown) which is fastened to the frame 31 below the attaching strips 38.

In cases such as in Fig. 7 wherein a rubber cushion is to be attached to the seat base the top fabric 21, before assembling in the seat base is preferably frictioned on both sides with rubber compound, instead of only on the under side, so that in the finished seat base the top thereof is rubber surfaced, as at 40 in Fig. 7, to insure a better bond thereto of the cement by which the rubber cushion is attached to the seat base. When the rubber cushion and seat base are thus bonded together, they become practically a unitary structure and the seat base serves to reinforce the cushion and the cushion to give added stability to the base thereby affording an especially advantageous and desirable seat cushioning.

Another seat base mounting, of suspended form, shown in Fig. 8 is especially simple and convenient. In this form no cleats are employed as at 32 in Fig. 7, the seat base, indicated at 19 being suspended directly from the chair frame by means of the marginal extension 28 of the seat base. In this case the seat base 19 is inserted in the chair well within the marginal flange 28 upturned against the inner face of the chair frame and this marginal flange 28 is secured to the frame 31 by tacks 41 spaced preferably about one inch apart. In this type of mounting the frame 20 is instrumental in distributing stresses to the supporting tacks 41 and it is therefore preferred to make the frame 20 of spring steel for this mounting.

In this structure of Fig. 8 a rubber cushion 35 also is employed and cemented to the seat base 19 and has an overhanging portion 36 with attached tape 38 secured to the frame by tacks 39 as in the structure of Fig. 7.

Figs. 9 and 10 illustrate a seat base and cushion for steel tube furniture or seats. In this embodiment a steel tube type of chair seat frame 42 is provided with a plurality of inwardly projecting tabs 43 welded to the frame and each of the tabs is provided with an opening 44 to freely receive a screw. A seat base 19, such as previously described, is provided, the frame 20 of which has a plurality of threaded openings 45 adapted to register with the openings 44 of the tabs 43. A foam sponge cushion 46 is cemented to the base 19 after which upholstering cloth 47 is then applied over the cushion and the margins adhesively secured to the under side of the base as indicated at 48 in Fig. 10. The base with upholstered cushion assembled thereon is then mounted in place and is secured in position with screws 49.

In the structure illustrated in Figs. 11 and 12 the seat base 19 is mounted directly on the chair seat frame 50, the marginal frame 20 being provided with openings at intervals around to receive the wood screws 51 which are engaged through these openings and into the frame 50, and the extended margin 28 of the seat base 19 is trimmed off as indicated at 28ᵇ to substantially coincide with the outer dimensions of the chair frame 50. A foam sponge cushion 53 is adhesively secured to the base 19 and has a tacking tape 54 adhesively secured therearound and is tacked to the frame as at 55.

Padding other than foam sponge may of course be employed in this structure of Fig. 12 as well as in other structures if desired, or in some structures, the cushioning may be entirely omitted. For example, as shown in Fig. 13 the seat base 19, made with a flat top as shown in Fig. 3, is merely covered with upholstery cloth 56 and secured to the top of the chair seat frame 57.

For mounting this seat base on the frame 57 a tacking strip 58 is preferably stitched or otherwise secured to the under side of the seat base 19 at a proper location to extend downwardly along the inner side of the seat frame 57 and is merely tacked to the seat frame as indicated at 59. This tacking strip may be conveniently attached as shown in Fig. 13 with the same stitching 26 that is employed to secure the two fabric layers 21 and 22 together along the inner margin of the frame 20.

The upholstery cloth 56 may be applied in any desired manner as for example, as shown in Fig. 13, the two ply fabric margin 28 of the seat base may be trimmed off to leave only a narrow width 28ᶜ suitable for stitching beyond the frame 20 and the edge of the upholstery fabric 56 may be stitched to this narrow extended edge 28ᶜ as at 61, preferably with a binding strip 62 enclosing the edge structure and attached with the same stitching 61.

This structure of Fig. 13 may of course be completely prepared with the covering of upholstery cloth 56 ready for mounting and provides a convenient replacement unit because of its complete assembly and convenience of attachment, it being understood of course, that complete units similar to that of Fig. 13 may also be made with padding or a rubber cushion between the seat base 19 and upholstery cloth 56 and likewise attached to the chair frame with a tacking strip 58 or in some similar manner. Moreover, the upholstery cloth 56, instead of being stitched at the edge as at 61 may have the edge portions thereof turned under and secured to the under side of the seat base 19 in a manner somewhat similar to that shown in Fig. 10.

Figs. 14, 15 and 16 illustrate an automobile type seat cushion using a seat base 63 embodying the present invention. In this construction an elongated flat steel marginal frame 64 is preferably provided with two transverse struts 65 curved downwardly to provide ample clearance for any depressing of the fabric center section of the seat which may occur in use, and welded at their ends to the under side of the frame 64 as indicated at 66. The frame 64 is secured between two stretched fabric layers 67 and 68 of duck or canvas in exactly the same manner as the fabric layers 21 and 22 are secured to the frame 20 in Fig. 1, both layers 67 and 68 being frictioned with rubber and gum coated on their inner faces, adhesively combined throughout their area, stretched tautly and stitched along the inner and outer sides of the frame 64, as indicated by numerals 26ª and 26ᵇ respectively, and thereafter vulcanized all as explained in connection with Fig. 1. Obviously the lower fabric layer 68 is slitted or cut away as at 69 to straddle the ends of the struts 65 and the inner stitching 26ª is interrupted at the struts.

The two ply fabric deck thus produced is provided with ventilation apertures 70 which may be arranged in matching rows 71, 72, 73 and 74 and the matching apertures of the rows 71 and 72 may be connected by slits 75 and the matching apertures 70 of the rows 73 and 74 connected by slits 76.

A foam sponge cushion 77 is cemented to the base thus formed, the top surface of the fabric layer 67 being preferably frictioned with rubber before vulcanization for this purpose, and a tape 78 is cemented around and to the foam sponge cushion and turned under the seat base 63 and secured to the under side thereof as at 79 to combine the cushion and base into a substantially integral assembly.

This combined cushion and base may be supported in any desired manner, as for example by a sheet metal frame or riser 80 which is provided with an inturned flange 81 about its upper edge to support the base and cushion assembly. A plurality of bendable lugs 82 are provided around the top of the riser and are bent inwardly at their upper ends and forced into the cushion 77 and over the margin of the seat base 63 as shown at 83 in Fig. 16 to secure the cushion assembly to the frame or riser 80. A tacking strip 84 is provided along the lower edge of the riser 80 and upholstering material 85 which covers the cushion 77 is extended down around the cushion and riser and fastened to this tacking strip as indicated at 86.

Rubber inserts may be provided in these various seat bases, one form of which is shown in the seat base 87 of Figs. 17 and 18 which show an automobile type of seat base. This seat base 87 is made with two fabric layers 88 and 89 stretched on a marginal frame 90 and stitched and vulcanized together in exactly the same manner as in the structure of Figure 1. The fabric layers 88 and 89 however are correspondingly cut away to provide a matching wide U-shaped opening 91 in each extending across the rear of the seat base and forwardly at each side and preferably of centrally reduced width at the back as shown in Fig. 17, and a similarly U-shaped piece 92 of sheet rubber but of greater width and length is permanently secured along its edges between the opposed fabric layers 88 and 89 as shown at 93 in Fig. 18 to provide an elastic filler or insert for the opening 91.

Temporary bridgings 94 may be provided across the insert 92 to prevent undue stretching of the rubber 92 during stretching of the fabrics 88 and 89 and to prevent relaxation thereof during vulcanization, which said bridgings 94 are removed after the seat base is completed, or the fabrics 88 and 89 may be uncut until after completion of the seat base and then have the U-shaped portions 91 cut away, in which case precautions may be taken, for example by using paper facings on all except the marginal portions of the rubber insert 92, to avoid adhesion to the rubber of the fabric portions to be subsequently cut away.

In some cases where an extended fabric margin 28 is not required entirely around the seat base 19 a single piece 95 of fabric may be employed, instead of the two pieces 21 and 22, folded along one length of the frame 20, as shown at 96 in Fig. 4, in which case, of course, the fabric must be of an area corresponding approximately to the combined area of the fabric layers 21 and 22. In this form the single sheet 95 of fabric is frictioned and gum coated on one side, a stiffening frame 20 is laid on one half of the gummed face of the fabric so treated and the other half of the fabric is then folded over to enclose the frame between the laminations of the fabric. Thereafter the fabric is pressed together, tensioned, sewed, vulcanized, and perforated as above described for the structure of Fig. 1, except that the outside stitching 27 is omitted along the folded edge 96.

Instead of coating the inner faces of the fabrics 21 and 22 with ordinary gum, they may have a coating of rubber, compounded with a blowing agent, calendered thereon which in the subsequent vulcanization is expanded by the blowing agent to produce sponge rubber in a manner well known in the art.

Thus the seat base is formed as shown in Fig. 5 with a sponge filler 97 between and separating the fabrics 21 and 22, thereby affording a softness of seat base which is desirable for some purposes. Moreover, since the fabric layers 21 and 22 are stitched together at opposite sides of the frame 20 at 26 and 27, prior to vulcanization the sponging of the rubber and spreading of the fabrics 21 and 22 thus imposes an increased tension on these fabrics. The base, thus formed, may, of course, be provided with perforations for ventilation like the perforations 29 of the base of Fig. 1.

The above seat base may be used advantageously in many other ways in making chairs, or the like, and the resiliency of the marginal frame 20 may be utilized to give yieldability to the seat bottom or seat back. For example, in Figs. 19 and 20 a chair is shown wherein the seat bottom and the seat back are both provided with a fabric seat deck constructed with a marginal frame 20 in the manner above described, these marginal frames being of spring steel and mounted to permit yielding thereof to pressure applied on the seat bottom and the seat back.

While I have shown the seat base herein in a preferred form and as applied to seat bottoms, it is to be understood that it may be employed for seat backs or elsewhere and that various changes and modifications may be made without departing from the spirit of the invention, the scope of which is to be determined by the appended claims.

I claim as my invention:

1. A pre-formed unit for seat base purposes or the like, said unit comprising a marginal seat base frame and two layers of fabric or the like having the frame interposed therebetween, said frame being flat in the plane of the unit, said layers of fabric or the like being tautly stretched on the frame and bonded together by a vulcanized rubber compound.

2. A pre-formed unit for seat base purposes or the like, said unit comprising two layers of fabric or the like with a flat marginal frame interposed therebetween, said frame being of little thickness but of substantial horizontal width in the plane of the unit, said layers being stretched taut within the area bounded by the frame and bonded together by a vulcanized rubber compound at the inner and outer sides of the frame.

3. A pre-formed unit for seat base purposes or the like, said unit comprising two layers of fabric or the like with a flat marginal frame interposed therebetween, said frame being of little thickness but of substantial horizontal width in the plane of the unit, said layers being stretched taut within the area bounded by the frame and stitched together along the inner and outer sides of the frame and said layers being bonded together at the inner and outer sides of the frame by a vulcanized rubber compound and the stitches bonded to the layers by the vulcanized rubber compound.

4. A pre-formed unit for seat base purposes or the like, said unit comprising two layers of fabric or the like with a marginal frame interposed therebetween, said layers being stretched taut within the area bounded by said frame and bonded together by an intermediate layer of vulcanized sponge rubber.

5. In a seat or the like, a supporting structure, a resilient seat base comprising a surrounding marginal frame and two layers of fabric or the like having the frame interposed therebetween and being tautly stretched on the frame and secured together in face to face relationship, means securing the marginal frame to the supporting structure, and a seat cushion or the like of spongy rubber secured to the upper side of said seat base.

6. In a seat or the like, a supporting structure, a resilient seat base comprising a surrounding marginal frame and two layers of fabric or the like having the frame interposed therebetween and being tautly stretched on the frame and secured together in face to face relationship, means securing the marginal frame to the supporting structure, and a seat cushion or the like of spongy rubber secured to the upper side of said seat base with the marginal frame of the latter underlying the margin of said cushion.

7. The method of making a seat base unit or the like, which comprises coating the inner faces of two fabric or like layers with a vulcanizable rubber compound, interposing a flat marginal frame between the layers and adhesively securing the coated faces together at the inner and outer sides of the marginal frame, then stretching the fabrics outwardly around the frame and stitching the stretched fabrics together along the outer edge of the frame, and thereafter vulcanizing the assembled structure.

MARION MORGAN CUNNINGHAM.